United States Patent [19]
Beggs

[11] Patent Number: 5,149,549
[45] Date of Patent: Sep. 22, 1992

[54] METHOD AND COMPOSITION FOR ACHIEVING ANIMAL WEIGHT GAIN WITH MYCOTOXIN-CONTAMINATED ANIMAL FOOD

[75] Inventor: Lawrie Beggs, Roselle, Ill.

[73] Assignee: American Colloid Company, Arlington Heights, Ill.

[21] Appl. No.: 616,611

[22] Filed: Nov. 21, 1990

[51] Int. Cl.$^5$ ............................................. A23K 1/00
[52] U.S. Cl. ........................................ 426/2; 426/74; 426/623; 426/630; 426/807
[58] Field of Search .................. 426/2, 74, 807, 623, 426/630

[56] References Cited

U.S. PATENT DOCUMENTS 4,749,979  5/1988  Gimber et al. .................. 426/630

OTHER PUBLICATIONS

Lindemann et al., "Assessment of Fiber Sources & Selected Mineral Requirements for Growing Swine", Progress Report from Tidewater Agri. Exp. Station VPI & State University, Suffolk, Va., (1989), Dialog Abstract 09131332 file 60.
Lindemann et al., "Evaluation of the Inclusion of Graded Levels of Sodium Bentonite on the Effects of Aflatoxin Contaminated Corn Fed to Weanling/Growing Swine", J. of Animal Science, vol. 68, Supplement 1, published Jul. 31, 1990, Abstract No. 583 & 87.

Primary Examiner—R. B. Penland
Attorney, Agent, or Firm—Marshall, O'Toole, Gerstein, Murray & Bicknell

[57] ABSTRACT

A method of increasing the nutritional value of mycotoxin-contaminated animal feed ingested by an animal by feeding the animal a montmorillonite clay simultaneously with the mycotoxin-contaminated animal feed. The montmorillonite clay can be fed to the animal in any form, e.g. granular, powder, pellets and the like or can be admixed with other animal food or feed supplements, so long as the clay is present in the animal's stomach (digestive tract) at the same time as the mycotoxin-contaminated animal feed in an amount sufficient to absorb or adsorb mycotoxin from the digestive tract of the animal and thereby aid the animal in metabolic absorbtion of nutrients from the contaminated animal feed.

10 Claims, No Drawings

METHOD AND COMPOSITION FOR ACHIEVING ANIMAL WEIGHT GAIN WITH MYCOTOXIN-CONTAMINATED ANIMAL FOOD

FIELD OF THE INVENTION

The present invention is directed to a method of retarding or ameliorating the absorption of mycotoxins, particularly aflatoxins, in animals to improve the metabolic capacity of the animal to deal with mycotoxins by feeding the animals a montmorillonite clay, particularly sodium and/or calcium bentonite, simultaneously with mycotoxin-contaminated nutrients, such that the montmorillonite clay and the nutrients are digested together. The montmorillonite clay digested with the mycotoxin-contaminated animal feed, such as corn or peanuts, retards the absorption of mycotoxin-contaminants in the food and permits the mycotoxin to be eliminated in the animal's stool together with the montmorillonite clay.

BACKGROUND OF THE INVENTION AND PRIOR ART

Mycotoxins are the toxic metabolites resulting from fungal infestation and growth on cereal grains and can result during growth, harvest, transportation or storage of the grains. While mycotoxins have been a problem for centuries, it was not until 1960 that significant research efforts in the role of mycotoxins in animal production occured. The incident which spurred this interest was the realization of the causal nature of aflatoxins in a disease called Turkey X disease in turkey poults in Great Britain.

Mycotoxin contamination of cereal grains is a relatively common problem. The exact type and extent of the problem is a function of mold types, growing conditions during the crop season and storage practices. Aflatoxins are a mycotoxin of particular concern since aflatoxin $B_1$ is one of the most potent known hepatocarcinogens. Aflatoxin ingestion is invariably accompanied by a reduction in feed intake and, consequently, a reduction in growth rate of pigs and other animals.

There has been much recent interest in the use of products which are already approved as anticaking agents or pelleting aids in feed manufacturing as ameliorators of the adverse effects of aflatoxin ingestion in swine. A hydrated attapulgite clay (sodium calcium aluminosilicate), selenium, and folic acid (a B-vitamin) presently are used as feed supplements for ameliorating the effects of aflatoxin-contaminated feeds on animals, such as pigs. An attapulgite clay present on the market for this purpose is NOVASIL marketed by Engelhard Corporation, Cleveland, Ohio.

While the acute symptoms of mycotoxins, e.g. aflatoxicosis, in swine are relatively easy to identify and the economic losses evident, the chronic symptoms of slightly diminished performance and immunosuppressive effects probably constitute a much greater economic loss in pork production than for other animals, e.g. beef. Traditional methods of dealing with grains known to be contaminated with mycotoxins are: blending with 'clean' grain to reduce the contamination level; screening or other means of physical separation to remove highly contaminated fines; and ammoniation or heating to detoxify the grain. Of more recent interest in the U.S. is the use of products which are already approved as anticaking agents or pelleting aids to reduce the adverse effects of aflatoxin ingestion.

As stated in Kirk-Othmer, Encyclopedia of Chemical Technology, Vol.5, 1964, p. 552, of all the clays, only attapulgite has been used extensively as an absorbent material; and at p.580, attapulgite clay, activated by moderate heating has been used as an absorbent for toxins. As far as applicant is aware, montmorillonite clays have not been used as a feed supplement to prevent the absorption of toxins into an animal's bloodstream. Montmorillonite clays are not known to provide any advantage in permitting almost unhindered weight gain in animals fed mycotoxin-contaminated grains, such as corn, as discovered by applicant.

An article describing the work leading to the present invention, carried out for this assignee by Dr. M. D. Lindemann et al., Associate Professor of Animal Science, Virginia Polytechnic Institute and State University, appears at J. Animal Science 68 (Suppl.1): 39, 1990, which article is not prior art to this application.

The montmorillonites are most effective with animal feeds contaminated with at least about 400 parts per billion (ppb) mycotoxin, and most significant amelioration of animal weight reduction is achieved at animal feed contamination levels of at least about 800 parts per billion mycotoxin, based on the total weight of contaminated feed. Some benefit is achieved, however, with montmorillonite clay fed to animals so long as the animal feed has sufficient mycotoxin contamination to cause measurably less weight gain in the animal, as compared to a controlled feed that is not contaminated, e.g. at least 50 to 100 parts per billion mycotoxin contamination. The montmorillonite should be fed to the animal in an amount sufficient to aid in the metabolic absorption of nutrients from the mycotoxin-contaminated animal feed, e.g. about 0.1% to about 1% based on the weight of the contaminated animal feed. Higher percentages of montmorillonite clay, based on the weight of mycotoxin-contaminated animal feed, can be used without any adverse effect, but without significant advantage.

Accordingly, one aspect of the present invention is to provide a method of increasing the amount of nutrients absorbed by an animal that is fed mycotoxin-contaminated food by feeding the animal a montmorillonite clay in addition to the contaminated food.

Another aspect of the present invention is to provide a method of increasing the weight gain achievable by feeding an animal mycotoxin-contaminated feed by simultaneously feeding the animal montmorillonite clay with the mycotoxin-contaminated feed.

Another aspect of the present invention is to provide a mycotoxin-contaminated animal food supplement comprising a montmorillonite clay for addition to the contaminated feed in an amount of at least about 0.1% based on the weight of the mycotoxin-contaminated animal feed.

The above and other aspects and advantages of the present invention will become more apparent from the following detailed description of the preferred embodiments of the present invention.

DETAILED DESCRIPTION OF THE PREFERRED EMBODIMENTS

The present invention is based upon the surprising discovery that montmorillonite clays fed to animals that are fed a mycotoxin-contaminated animal feed will unexpectedly provide for almost unhindered weight gain, approximately the same as would occur if the feed were not contaminated. The particular form of the clay, e.g.

powdered, granular, compressed, dried, wet, non-compressed, pelletized, and the like, should not matter so long as the animal ingests the montmorillonite clay before, after or during the ingestion of the contaminated animal feed. In this manner, the montmorillonite clay and the mycotoxin-contaminated feed are in the animal's stomach simultaneously so that the mycotoxin contamination, particularly aflatoxin, can be absorbed and/or adsorbed by the montmorillonite clay to aid the animal to metabolize the nutrients from the feed without significant hindrance from the mycotoxin contamination.

All montmorillonite clays aid an animal's metabolic absorption of nutrients from mycotoxin-contaminated animal feed in accordance with the method of the present invention. In accordance with one important embodiment of the present invention, the colloidal clay is bentonite. A preferred bentonite is sodium bentonite which is basically a hydratable montmorillonite clay of the type generally found in the Black Hills region of South Dakota and Wyoming. This clay has sodium as a predominant exchange ion. However, the bentonite utilized in accordance with this embodiment of the present invention may also contain other cations such as calcium, magnesium, lithium and iron. Particularly effective is sodium bentonite, and calcium bentonite should provide approximately equal amelioration of mycotoxin-induced weight loss. There are cases wherein a montmorillonite predominant in calcium ions can be converted to a sodium variety through a well known process called "peptizing". The montmorillonite clay utilized in this invention may be one or more peptized bentonites. The montmorillonite clay may be dioctahedral or trioctahedral, such as any of the smectite clays or mixtures thereof. Examples are Beidellite, Nontronite, Hectorite, Sepiolite and Saponite.

In order to show the new and unexpected results achieved with montmorillonite clay, in comparison to prior art attapulgite clay, selenium and folic acid mycotoxin ameliorators, sodium bentonite was fed to young, growing swine at various levels (0.25% to 0.75%) of sodium bentonite and various levels of aflatoxin contamination of the feed (0-840 ppb) in accordance with the following procedure.

Crossbred pigs (having a mean initial age of 36 days, and a mean initial weight of 9.2kg) were used in a 42-day trial to evaluate the ability of a sodium bentonite (SB) to alleviate the adverse effects of feeding corn contaminated with aflatoxin $B_1$(Aflatoxin) to young, growing swine. Pigs were randomly assigned from outcome groups based on litter, sex and body weight to one of the following dietary treatments: 1) 0 ppb Aflatoxin, 2) 800 ppb Aflatoxin, 3) same as treatment 2 plus 0.25% SB, 4) same as treatment 2 plus 0.50% SB, 5) same as treatment 2 plus 0.75% SB, 6) same as treatment 1 plus 0.5% SB. The basal diet was a 1.02% lysine, cornsoybean meal diet with 1% soybean oil for dust suppression. Three replicate pens of three pigs/pen were used per treatment. Numerical depressions in feed intake and growth rate due to the feeding of the contaminated grain were evident from week 1, being significant ($P<0.05$) from week 2 onward. Daily feed intake in grams (g) and gain (g) in grams values, respectively, for treatments 1-6 over the total trial were: (1) 1263,580; (2) 928,422; (3) 1188,523; (4) 1226,545; (5) 1269,547; and (6) 1369,579. Inclusion of SB in feeds containing aflatoxin improved daily feed and gain values in a linear ($P<0.001$) and quadric ($P<0.03$) manner, but the inclusion of SB in the diet without aflatoxin was without effect ($P<0.25$). Clinical chemistry data on blood samples obtained on day 42 indicated that consumption of dietary treatment 2 was effecting changes consistent with liver dysfunction. All parameters which were adversely affected by the ingestion of treatment 2 ($P<0.05$)) were linearly improved by inclusion of SB in the diet ($P<0.05$), The magnitude of improvement in clinical parameters mirrored the daily gain response. The inclusion of SB, particularly in diets containing 800 ppb Aflatoxin fed to young swine appears to be appropriate and efficacious.

In an initial study, corn naturally contaminated with about 1200 ppb aflatoxin $B_1$ was obtained from a grain producer in southeast Virginia. Ninety crossbred pigs were weaned at about 28 days of age and at about 37 days of age randomly assigned from outcome groups based on litter, sex, and body weight to one of the following treatments: 1) 0 ppb aflatoxin -positive control, 2) 420 ppb aflatoxin - intermediate control, 3) 840 ppb aflatoxin - negative control, 4) 0 ppb aflatoxin plus 0.9 parts per million (ppm) Selenium, 7) 0 ppb aflatoxin plus 2 ppm folic acid, 8) 840 ppb aflatoxin plus 0.2 ppm folic acid, 9) 0 ppb aflatoxin plus 0.5% hydrated sodium calcium attapulgite clay (HSCA), 10) 840 ppb aflatoxin plus 0.5% HSCA. Three replicate pens of three pigs/pen were used per treatment. A 1.01% lysine cornsoybean meal diet that met or exceeded all NRC (1979) recommended and uncontaminated corn in the diet. Clinical chemistry analyses (total bilirubin, blood urea N, glucose, albumin, GGT, AST, Ca, P, Mg, Na, K, Cl) were conducted on the blood samples obtained via vena cava puncture on day 49.

In this study, daily gain was linearly depressed ($P<0.01$) with increasing levels of aflatoxin in the diet (TABLE 1). During the initial 28 day period the intermediate level of aflatoxin, 420 ppb, resulted in an intermediate level of daily gain; however, in the final 20 day period, pigs fed this diet gained at a rate comparable to pigs fed the control diet without aflatoxin. Improvements in growth were observed due to HSCA inclusion ($P<0.05$) in the diet in period 1, and the selenium ($P<0.05$), folic acid ($P<0.05$), and HSCA ($P<0.01$) in period 2. Over the total trial period, pigs that were fed the contaminated corn diet containing HSCA gained almost the same as pigs fed the positive control while pigs fed the folic acid supplemented diet exhibited a 40% recovery of the weight gain between the positive and negative controls. Most of the effect of aflatoxin on body weight gain was due to reductions in feed intake; some differences in feed/gain were noted. But, since diets were composed of different corn sources, the feed/gain values might be more reflective of differences in the energy contents of the grain.

In instances of aflatoxicosis, several parameters indicative of liver function are affected. Proteins synthesized by the liver would decrease and liver enzymes (such as GGT and SGOT) will leak out of hepatocytes and appear in greater concentrations in the blood. Examination of the clinical chemistry data in TABLE 2 indicates that liver damage was occuring as a result of the increasing aflatoxin levels, especially the highest level, 840 ppb. Selenium, folic acid and HSCA all improved some of the parameters of liver function, but HSCA clearly predominated in providing significant improvements. While there were effects noted for some of the minerals, the values for pigs on the various treatments fell within normal ranges and the effects were quantitatively smaller than were observed for the indicators of liver function.

In a second study, corn naturally contaminated with about 2400 ppb aflatoxin $B_1$, was obtained and 63 crossbred pigs (mean initial age of 36 days and mean initial weight of 9.2 kg) were used in a 42 day trial to assess folic acid, HSCA and the two sodium bentonites (SB1 and SB2) as ameliorators of the chronic effects of aflatoxin ingestion. The pigs were randomly assigned from outcome groups based on litter, sex and body weight to one of the following treatments: 1) 0 ppb aflatoxin, 2) about 800 ppb aflatoxin by replacing appropriate quantities of clean corn with the contaminated corn, 3) same as treatment 2 plus 2 ppm folic acid, 4) same as treatment 2 plus 0.5% HSCA, 5) same as treatment 3 plus 0.5% SB2. Three replicate pens of three pigs/pen were used per treatment. The basal diet was a 1.02% lysine, corn-soybean meal diet with 1% soybean oil for dust suppression. Blood samples were obtained via vena cava puncture on day 42 for clinical chemistry analyses.

As in the previous study, those pigs fed the aflatoxin-contaminated diet without an additive grew slower (table 3, $P<0.001$) than pigs fed a diet without aflatoxin during both 21-day periods of the trial. Similar to study 1, the HSCA addition improved growth rate ($P<0.01$) in both periods for a total trial recovery of 83% of the loss in daily gain due to aflatoxin inclusion in the diet. Both sodium bentonites improved performance ($P<0.01$) and, while no direct statistical comparisons were made, mean improvement in daily gain was better than that of the HSCA. The improvements in growth rate were due to improvements in feed intake with no overall improvement in feed efficiency.

In the initial 21 day period there did appear to be tendencies toward improved feed/gain values but the opposite was observed in the final 21 day period. The reversal in the final 21 day period is due to the large difference in body weight of the pigs. In order to keep the smallest pigs from being cold-stressed (those pigs fed the aflatoxin-contaminated diet with no additive) the heating/ventilation system was set to maintain the temperature within the zone of thermoneutrality for the smaller pigs; this setting actually caused some of the larger pigs to be slightly heat-stressed and resulted in an elevation of feed/gain on the better diets. The lack of a positive effect of the aflatoxin-free diet and the diets containing HSCA and the two sodium bentonites on feed/gain, then, is attributed to be an artifact of an equal-length study with widely disparate final body weights among treatments. If the study had been conducted to a common final bodyweight, then the aflatoxin-free diet and the diets containing HSCA and the sodium bentonites probably would have resulted in improvements in feed/gain also.

The addition of 2 ppm folic acid in this study resulted in a nonsignificant ($p>0.10$) improvement in daily gain of 4%. There was no readily apparent answer to the diminished magnitude of the folic acid response compared to study 1. However in the initial 21 day period, the response was about 6% while there was no response in the final 21 day period. It should be noted that the initial weight of the pigs was smaller and the feed intake (and therefore absolute aflatoxin load) for the initial period was greater. It is known that younger, smaller pigs are more susceptible to aflatoxin. While folic acid supplementation would appear to be a part of the answer to aflatoxin contamination, it is not the sole answer and its beneficial effects may be diminished by sufficiently high aflatoxin ingestion.

The blood chemistry profile (TABLE 4) was consistent with the concept of liver damage due to aflatoxin and improvement due to the additives, HSCA and the sodium bentonites. The response for many parameters mirrored the daily gain response. There did not appear to be as much detriment due to aflatoxin as was exhibited in study 1 but the study was 7 days shorter and the contaminated corn was from a different source.

TABLE 1

PERFORMANCE OF WEANLING PIGS FED GRADED LEVELS OF AFLATOXIN-CONTAMINATED CORN WITH VARIOUS AMELIORATORS IN STUDY 1[a]

| | Aflatoxin, ppb | | | | | | | | | | |
|---|---|---|---|---|---|---|---|---|---|---|---|
| | 0 | 420 | 840 | 0 | 420 | 840 | 0 | 840 | 0 | 840 | |
| | | | | | | Additive, ppm | | | | | |
| | — | — | — | .9 Se | .9 Se | .9 Se | 2 FA | 2 FA | HSCA | HACA | Effects |
| Bodyweight, kg | | | | | | | | | | | |
| Initial | 10.6 | 10.5 | 10.6 | 10.6 | 10.8 | 10.6 | 10.5 | 10.5 | 10.6 | 10.8 | |
| Intermediate | 23.7 | 20.4 | 16.5 | 23.1 | 20.4 | 15.8 | 24.1 | 18.2 | 23.7 | 21.3 | |
| Final | 35.5 | 32.4 | 23.9 | 36.0 | 33.1 | 25.3 | 36.6 | 28.3 | 37.0 | 34.1 | |
| Avg. Daily Gain, kg | | | | | | | | | | | |
| Period 1 | .47 | .35 | .21 | .45 | .34 | .19 | .49 | .28 | .47 | .37 | b,f,h |
| Period 2 | .59 | .60 | .37 | .65 | .64 | .48 | .62 | .50 | .66 | .64 | c,d,e,g,h |
| Overall | .52 | .46 | .28 | .53 | .47 | .31 | .54 | .37 | .55 | .48 | b,c,e,g,h |
| Avg. Daily Feed, kg | | | | | | | | | | | |
| Period 1 | .79 | .69 | .52 | .79 | .69 | .47 | .83 | .64 | .83 | .76 | b,f |
| Period 2 | 1.61 | 1.32 | .84 | 1.69 | 1.43 | .98 | 1.66 | 1.10 | 1.72 | 1.73 | b,g,h |
| Overall | 1.13 | .95 | .67 | 1.16 | 1.00 | .68 | 1.18 | .83 | 1.20 | 1.17 | b,g,h |
| Feed/Gain | | | | | | | | | | | |
| Period 1 | 1.68 | 1.96 | 3.28 | 1.77 | 2.01 | 2.55 | 1.70 | 2.30 | 1.76 | 2.08 | b |
| 2 | 2.73 | 2.21 | 2.33 | 2.63 | 2.24 | 2.10 | 2.66 | 2.22 | 2.60 | 2.73 | b,h |
| Overall | 2.18 | 2.10 | 2.67 | 2.21 | 2.14 | 2.42 | 2.16 | 2.24 | 2.18 | 2.44 | |

[a]Period 1 covers initial 28 days, period 2 covers final 20 days; Se = selenium, FA = folic acid, HSCA = .5% hydrated sodium calcium aluminosilicate (attapulgite clay).
[b]Linear effect of aflatoxin, $P < .01$.
[c]Quadratic effect of aflatoxin, $P < .05$.
[d]Selenium effect, $P < .05$.
[e]Folic effect, $P < .05$.
[f,g]HSCA effect, $P < .05, .01$, respectively.
[h]HSCA - aflatoxin interaction, $P < .05$.

TABLE 2

BLOOD CLINICAL CHEMISTRY OF WEANLING PIGS FED GRADED LEVELS OF AFLATOXIN-CONTAMINATED CORN WITH VARIOUS AMELIORATORS IN STUDY 1.[a]

| | Dietary Treatments Aflatoxin, ppb | | | | | | | | | | |
|---|---|---|---|---|---|---|---|---|---|---|---|
| | 0 | 420 | 840 | 0 | 420 | 840 | 0 | 840 | 0 | 840 | |
| | | | | | | Additive, ppm | | | | | |
| | — | — | — | .9 Se | .9 Se | .9 Se | 2 FA | 2 FA | HSCA | HSCA | Effects |
| Total bilirubin, ($\times 10^{-3}$) mg/dl | 100 | 96 | 299 | 84 | 124 | 82 | 58 | 173 | 82 | 117 | b,d1,e,f,h |
| Blood urea N, mg/dl | 19.4 | 14.3 | 13.2 | 12.8 | 17.9 | 16.4 | 17.3 | 17.2 | 18.5 | 17.2 | g,h,i2 |
| Glucose, mg/dl | 104 | 103 | 93 | 109 | 104 | 100 | 108 | 98 | 108 | 107 | b,f |
| Albumin, g/dl | 3.8 | 3.7 | 3.4 | 3.7 | 3.7 | 3.4 | 3.8 | 3.6 | 3.8 | 3.8 | b,f,g |
| GGT, IU/l[j] | 25 | 38 | 42 | 26 | 33 | 35 | 19 | 31 | 19 | 32 | b |
| AST, IU/l[k] | 33 | 59 | 208 | 104 | 64 | 110 | 40 | 107 | 38 | 48 | b,f,g,h |
| Ca, mg/dl | 11.0 | 11.3 | 11.5 | 11.0 | 11.3 | 11.0 | 11.2 | 11.1 | 11.0 | 11.2 | i1 |
| Mg, mg/dl | 2.3 | 2.4 | 2.4 | 2.3 | 2.5 | 2.4 | 2.3 | 2.4 | 2.4 | 2.4 | |
| P, mg/dl | 10.0 | 10.1 | 9.3 | 10.2 | 10.4 | 9.6 | 10.6 | 9.6 | 9.9 | 11.0 | b,f,g |
| Na, meq/l | 144 | 144 | 141 | 147 | 147 | 143 | 144 | 143 | 144 | 147 | b,d2,f,g |
| K, meq/l | 5.6 | 5.9 | 5.7 | 6.0 | 6.5 | 5.6 | 6.0 | 5.9 | 6.1 | 6.3 | c,d1,f |
| Cl/meq/l | 103 | 103 | 100 | 103 | 102 | 102 | 101 | 101 | 102 | 102 | b |

[a]All values are for day 49 of test; Se = selenium, FA = folic acid, HSCA = .5% hydrated sodium calcium aluminosilicate (attapulgite clay).
[b]Linear effect of aflatoxin, $P < .05$.
[c]Quadratic effect of aflatoxin, $P < .05$.
[d1,d2]Selenium effect, $P < .10, .05$, respectively.
[e]Folic effect, $P < .10$.
[f]HSCA effect, $P < .05$.
[g]HSCA - aflatoxin interaction, $P < .05$.
[h]Selenium - aflatoxin interaction, $P < .05$.
[i1,i2]Folic acid*aflatoxin interaction, $P < .10, .05$, respectively.
[j]GGT = gamma glutamyl transpeptidase.
[k]AST = aspartate aminotransferance.

TABLE 3

PERFORMANCE OF WEANLING PIGS FED AFLATOXIN-CONTAMINATED CORN WITH VARIOUS AMELIORATORS IN STUDY 2[a].

| | Dietary Treatments Aflatoxin, ppb | | | | | | |
|---|---|---|---|---|---|---|---|
| | 0 | 800 | 800 | 800 | 800 | 800 | 800 |
| | | | | Additive, ppm | | | |
| | — | — | 2FA | HSCA | 2FA/HSCA | SB1 | SB2 |
| Body weight, kg | | | | | | | |
| Initial | 9.1 | 9.1 | 9.3 | 9.0 | 9.1 | 9.1 | 9.0 |
| Intermediate | 20.0 | 16.8 | 17.4 | 19.5 | 19.3 | 19.3 | 19.9 |
| Final | 36.2 | 26.5 | 27.2 | 34.3 | 34.4 | 34.9 | 35.1 |
| Avg. Daily Gain, kg | | | | | | | |
| Period 1[bcde] | .52 | .37 | .39 | .50 | .48 | .49 | .52 |
| Period 2[bcde] | .77 | .46 | .46 | .70 | .72 | .74 | .72 |
| Overall | .64 | .41 | .43 | .60 | .60 | .61 | .62 |
| Avg. Daily Feed, kg | | | | | | | |
| Period 1[bcde] | .93 | .72 | .73 | .87 | .90 | .84 | .97 |
| Period 2[bcde] | 1.71 | .92 | 1.03 | 1.58 | 1.59 | 1.57 | 1.69 |
| Overall[bcde] | 1.32 | .82 | .88 | 1.23 | 1.24 | 1.21 | 1.33 |
| Feed/Gain | | | | | | | |
| Period 1 | 1.79 | 1.96 | 1.89 | 1.75 | 1.87 | 1.73 | 1.86 |
| Period 2 | 2.22 | 2.00 | 2.23 | 2.24 | 2.21 | 2.12 | 2.34 |
| Overall | 2.04 | 1.99 | 2.08 | 2.04 | 2.07 | 1.96 | 2.14 |

[a]Period 1 covers initial 21 days, period 2 covers final 21 days.
[b]Aflatoxin effect (column 1 vs column 2, $P < .001$).
[c]ASCA effect (column 4 vs column 2, $P < .01$).
[d]SB1 effect (column 6 vs column 2, $P < .01$).
[e]SB2 effect (column 7 vs column 2, $P < .001$).

TABLE 4

BLOOD CLINICAL CHEMISTRY OF WEANLING PIGS FED AFLATOXIN-CONTAMINATED CORN WITH VARIOUS AMELIORATORS IN STUDY 2[a].

| | Dietary Treatments Aflatoxin, ppb | | | | | | |
|---|---|---|---|---|---|---|---|
| | 0 | 800 | 800 | 800 | 800 | 800 | 800 |
| | | | | Additive, ppm | | | |
| | — | — | 2 FA | HSCA | 2 FA/HSCA | SB1 | SB2 |
| Blood urea N, mg/dl[bcde] | 14.4 | 9.9 | 10.3 | 15.1 | 14.9 | 15.7 | 13.2 |
| Glucose, mg/dl | 107 | 103 | 100 | 110 | 108 | 110 | 102 |
| Albumin, g/dl[bcde] | 3.9 | 3.3 | 3.5 | 3.9 | 3.8 | 4.0 | 4.0 |

TABLE 4-continued
BLOOD CLINICAL CHEMISTRY OF WEANLING PIGS FED AFLATOXIN-CONTAMINATED CORN WITH VARIOUS AMELIORATORS IN STUDY $2^a$.

| | Dietary Treatments Aflatoxin, ppb | | | | | | |
|---|---|---|---|---|---|---|---|
| | 0 | 800 | 800 | 800 | 800 | 800 | 800 |
| | | | Additive, ppm | | | | |
| | — | — | 2 FA | HSCA | 2 FA/HSCA | SB1 | SB2 |
| $AST^f$, U/l | 58 | 83 | 83 | 61 | 64 | 58 | 67 |
| $ALKP^g$, U/l$^{bcde}$ | 180 | 262 | 248 | 182 | 201 | 194 | 199 |
| Ca, mg/dl | 10.7 | 10.8 | 10.8 | 10.8 | 10.6 | 10.9 | 10.6 |
| Mg, mg/dl | 2.5 | 2.4 | 2.4 | 2.4 | 2.4 | 2.5 | 2.4 |
| P, mg/dl | 8.9 | 8.6 | 8.8 | 8.7 | 8.6 | 8.8 | 8.8 |
| Na, meq/dl | 144 | 147 | 146 | 144 | 141 | 145 | 142 |
| K, meq/dl | 6.1 | 6.1 | 6.2 | 6.1 | 6.2 | 6.1 | 5.9 |
| Cl, meq/l | 102 | 103 | 103 | 101 | 99 | 102 | 100 |

$^a$All vakyes are for day 42 of test.
$^b$Aflatoxin effect (column 1 vs column 2, $P < .02$).
$^c$HSCA effect (column 4 vs column 2, $P < .02$).
$^d$SB1 effect (column 6 vs column 2, $P < .04$)
$^e$SB2 effect (column 7 vs column 2, $P < .05$).
$^f$AST = aspartate aminotransferance.
$^g$ASKP = alkaline phosphatize.

TABLE 5
RESPONSE OF YOUNG SWINE FED AFLATOXIN-CONTAMINATED DIETS TO GRADED LEVELS OF SODIUM BENTONITE IN STUDY 3.

| | Dietary Treatment Aflatoxin, ppb | | | | | |
|---|---|---|---|---|---|---|
| | 0 | 800 | 800 | 800 | 800 | 0 |
| | | | | SB2 | | |
| | — | — | .25% | .50% | .75% | .50% |
| Bodyweight, kg | | | | | | |
| Initial | 9.2 | 9.2 | 9.2 | 9.1 | 9.1 | 9.4 |
| Final | 32.4 | 26.1 | 30.1 | 31.0 | 31.0 | 32.6 |
| Avg. Daily Gain, kg$^{abc}$ | .58 | .42 | .52 | .55 | .55 | .58 |
| Avg. Daily Feed, kg$^{abc}$ | 1.26 | .93 | 1.19 | 1.23 | 1.27 | 1.33 |
| Feed/Gain | 2.17 | 2.18 | 2.29 | 2.25 | 2.32 | 2.29 |

$^a$Aflatoxin effect (column 1 vs column 2, $P < .001$).
$^b$SB2 linear response in aflatoxin-contaminated diets ($P < .001$).
$^c$SB2 quadratic response in aflatoxin-contaminated diets ($P < .025$).

There is some question whether the 0.5% inclusion rate for the clay products is the appropriate inclusion level. A third study was conducted with 54 crossbred pigs (mean initial age — 36 days, and mean initial weight of 9.2 kg) to examine inclusion rate. A sodium bentonite from the second study (SB2) was selected for dose titration. Pigs were randomly assigned from outcome groups based on litter, sex, and body weight to one of the following treatments: 1) 0 ppb aflatoxin $B_1$, 2) about 800 ppb aflatoxin by replacing appropriate quantities of clean corn with the contaminated corn used in study 2, 3) same treatment as 2 plus 0.25% SB2, 4) same as treatment 2 plus 0.5% SB2, 5) same as treatment 2 plus 0.75% SB2, 6) same as treatment 1 plus 0.5% SB2. The basal diet was a 1.02% lysine corn-soybean meal diet, with 1% soybean oil for dust suppression, which met or exceeded all NRC (1979) nutrient requirement estimates for pigs, as utilized in this study. Three replicate pens of three pigs/pen were used per treatment for the 42 day study.

Numerical depressions in feed intake and growth rate due to the feeding of the contaminated grain were evident from week 1, being significant ($P < 0.05$) from week 2 onward. Overall trial values (TABLE 5) demonstrated a quadratic response in feed intake and daily gain with no further improvements beyond the 0.50% inclusion rate. The addition of the sodium bentonite to the clean corn diet was without effect. There were, again, no significant effects on feed efficiency.

I claim:

1. A method of increasing the nutritional value of mycotoxin-contaminated animal feed ingested by an animal comprising feeding montmorillonite clay to said animal simultaneously with said mycotoxin-contaminated animal feed such that said montmorillonite clay and mycotoxin-contaminated animal feed are present simultaneously in the digestive tract of said animal, wherein said montmorillonite clay fed to said animal is fed in an amount sufficient to aid the metabolic absorption of nutrients from said contaminated animal feed.

2. The method of claim 1, wherein the montmorillonite clay is selected from the group consisting of sodium bentonite, calcium bentonite, magnesium bentonite, lithium bentonite, potassium bentonite, and mixtures thereof.

3. The method of claim 1, wherein the montmorillonite clay is fed to said animal in an amount of at least about ½ pound of clay per ton of contaminated animal feed.

4. The method of claim 3, wherein the montmorillonite clay is fed to said animal in an amount of at least about 1 pound of clay per ton of contaminated animal feed.

5. The method of claim 4, wherein the montmorillonite clay is fed to said animal in an amount of at least about 3 pounds of clay per ton of contaminated animal feed.

6. The method of claim 5, wherein the montmorillonite clay is fed to said animal in an amount of at least about 5 pounds of clay per ton of contaminated animal feed.

7. The method of claim 6, wherein the montmorillonite clay is fed to said animal in an amount of at least about 10 pound of clay per ton of contaminated animal feed.

8. The method of claim 1, wherein the animal feed is corn infected with aflatoxin in an amount of at least 500 parts per billion by weight.

9. The method of claim 8, wherein the animal feed is corn infected with aflatoxin in an amount of at least 700 parts per billion by weight.

10. The method of claim 9, wherein the animal feed is corn infected with aflatoxin in an amount of at least 800 parts per billion by weight.

* * * * *